Patented Jan. 19, 1932

1,842,083

UNITED STATES PATENT OFFICE

NATHANIEL M. ELIAS, OF NEW YORK, N. Y.

INSULATING AND SOUND PROOFING MATERIALS

No Drawing.   Application filed August 12, 1929.   Serial No. 385,463.

This invention relates to improved insulating and sound-proofing products and to a process of making them. It has for its chief object the economical production of materials having great heat insulating and sound-proofing properties from alkali silicates or mixtures containing chiefly alkali silicates.

Prior to my present invention it has been proposed to produce a heat insulating, cellular material from alkali silicates by the heating of the hydrated substance both with and without agitation. My study of the subject indicates, however, that the superior product which my invention contemplates requires the observance of conditions of heating of the starting material which so far as is known to me have not been disclosed in such prior proposed methods for the making of this product.

My study of the problem presented has further shown that it is highly desirable that the insulating material be of a uniformly cellular structure of low specific gravity with very small cells. I have now discovered that a product having this structure may be obtained by carrying out the heating process in two steps and by the careful observance of conditions as will be set forth in detail. The invention also contemplates the manufacture of the improved insulating material in the form of molded shapes or slabs, whereby the use of a binder is obviated.

The present invention constitutes an improvement over my invention as disclosed and described in my copending application for Letters Patent filed on July 6, 1927, under Serial No. 203,874, which has become Patent No. 1,724,185.

Briefly stated, the object of the present invention is to produce a slab or block of cellular alkali silicate material having greater mechanical strength and a greater resistance to atmospheric effects.

These results flow in part from the treatment to which the alkali silicate is subjected and in part from the characteristics of the resultant slab or block.

More specifically, the outer surface or layer of the slab or block manufactured by the process described hereinafter is substantially denser than the interior of the slab or block. The specific gravity of the block is substantially increased.

The following examples are illustrative of my improved process and also serve to disclose clearly the structure and physical characteristics of my improved slab or block.

1. Commercial sodium silicate solution is preferably utilized as the raw material for the manufacture of the improved slab or block. The commercial form having for example a $Na_2O$ to $SiO_2$ ratio of approximately 1:3.25 may be used, but I prefer to use silicates having a comparatively low alkaline content and high silica content, preferably those having a silica content varying between 76% and 80%. The suitable commercial sodium silicate is first evaporated preferably without agitation at a temperature slightly below 100° C. at atmospheric pressure. At 95° C. about five hours will be required to evaporate a solution of a depth sufficient to produce a cake of material two inches thick. By proceeding carefully in this manner, it is readily possible to accomplish the evaporation without the formation of a crust. If desired, the rate of evaporation may be increased and the formation of a crust avoided by heating the mass under a slight pressure at higher temperature, i. e. at from 100° C. to 200° C. under a pressure of 1.5 atmospheres absolute, and regulating the evaporation so that it does not exceed the rate of diffusion of water vapor through the drying film of silicate, otherwise excessive stratification into layers of substantially varying moisture content is apt to occur. In this manner the evaporation of a thickness of solution above mentioned may be carried out in one hour or less.

The evaporation is stopped at such a point that the resulting product contains 27% or less of moisture. It is a glassy solid which at temperatures above 200° C. is no longer sufficiently fluid to form large bubbles when the moisture escapes during the subsequent heating or baking step to be described.

The intermediate product as prepared above or by other methods to be described is now placed in a mold of desired shape and thickness. The bottom of the mold may be slidable in the frame of the mold so that the thickness of the resultant block or slab may be varied as desired. The molds and the material are now placed in a closed uniformly heated oven at a temperature of 550° to 700° C. This high temperature is maintained for only a short time, and during this time the rapid vaporization of the moisture converts the mass into a uniformly cellular mass, and the thickness of the slab is increased. The time during which this high temperature is maintained varies with the nature of the material and the nature of the block desired. It may vary from five to thirty minutes. Moisture escaping from the interior of the block prevents the main body portion of the block from reaching the temperature of the furnace and maintains it below its melting point. The surfaces of the block, however, do acquire the high temperature which causes partial fusion of the surface material. Care must be taken that this partial fusion penetrates only a short distance into the block or slab.

After the block or slab has been subjected to the high temperature for five to thirty minutes, depending upon the composition of the material, the temperature is dropped to 400° to 500° C. and annealed.

The baking process described above is continued until the moisture content has been very much reduced or completely eliminated. The puffy cellular mass resulting from the above described baking operation resembles a dense foam. It is cooled slowly so that it may anneal. This avoids the danger of crack formation. The material is then removed from the molds. If the baking has been carried out properly, the latter operation may be performed without difficulty as the product sticks only slightly. It may then be cut into suitable shapes for use.

If desired, the product may be given a water proof coating and this may be done by dipping it in or spraying it with a molten water proofing material, such as paraffin, pitch, or asphalt, or mixtures of these, or by wrapping it in a water proofing paper or fabric.

The slab resulting from the process above described has a partly fused and denser surface and a uniformly cellular interior, while the interior of the slab has a very low specific gravity and may vary from 0.05 to 0.15, the average specific gravity of the block or slab may be as high as 0.25. The high insulation quality of the slab is therefore maintained. On the other hand, the mechanical strength of the block or slab is increased, and its resistance to variable atmospheric conditions is increased. The resistance to atmospheric moisture is particularly high when the block is low in alkali content. I find that a silica content of 76% to 80% gives the best results.

2. Low-moisture-containing silicate powder may be heated with a silicate solution containing more than the desired amount of moisture so that the moisture content of the resulting mixture is reduced. An advantage of this method consists in the fact that the trimmings produced from cutting the finished cakes may be utilized. This method may advantageously be carried out along with the method first described. The heating is performed similarly to that described in the first example and the intermediate product obtained is in all respects similar to that described. The second heating step is the same as above set forth in Example 1.

3. Anhydrous alkali silicate glass similar to that used in the manufacture of commercial silicate solutions is dissolved in an autoclave with the calculated amount of water and the temperature and pressure maintained at such values as to cause the mixture to become homogeneous and to be fluid enough to be discharged into molds under pressure. The pressure within the molds may then be gradually released as the mess cools. This produces an intermediate product which may be treated in the manner already described.

In the practice of the method as outlined in the foregoing examples, it may be pointed out that the exact amount of moisture to be left in the intermediate product varies somewhat with the composition of the silicate solution, i. e., with the ratio of $Na_2O$ to $SiO_2$, the higher this ratio, the lower the moisture which should be left in the product prior to the baking step in order to avoid large cell formation. As a rule, however, all commercial silicates must be reduced to at least 35% moisture and in some cases to 25% or less. With as low a moisture content as 20% I have obtained a satisfactory final product.

By the use of the methods above described in detail, a product having low specific gravity and small uniform cells is produced. I attribute this beneficial property imparted to the material to the fact that the mass is relatively non-fluid when the moisture is driven off during the second or baking step. I have found that when it is attempted to carry out the final heating step with semi-fluid silicate that large and irregular cells are produced, and the resulting material has a widely varying specific gravity. I have furthermore found that by the use of agitation which has been previously proposed, a considerable breaking down of the cells and crushing of the mass results, and thus a product of inferior grade is produced. Furthermore, this mode of heating usually requires an open oven, the use of which makes it difficult to obtain a uniform heating. My experimentation has indicated that it is not necessarily the formation of a crust in itself which causes trouble, but the fact that the bottom layer of the drying material has a different moisture content than the middle layer and that this has a different moisture content than the top layer if the drying is not properly carried out, so that the moisture content is not uniform and the material puffs up differently in the different layers on baking, giving a non-uniform product even if the total moisture content is correct.

In general my improved product is characterized by cells of uniform size not exceeding ¼ inch in the longest dimension. For the most part, the cells are very much smaller. In spite of the small size of the cells, the specific gravity of the main body portion is below 0.15 and can be reduced to less than 0.05 if desired. The combination of this extremely low specific gravity with the small cell size and the fact that the material can be made in pieces as thick as three inches or more renders the product one of great value as a heat insulator, sound-proofing material and for other purposes.

As has been stated I may, and preferably do, obtain the final product as a slab which is either molded to, or may be cut to the desired size and shape. The use of the material in this form has the advantage over its use in divided form or pellets, in that there is no tendency of the undivided material to settle and thus become non-uniform.

In the baking operation, care must be taken that the high temperature be reduced before the complete expulsion of the moisture content of the mass, to considerably below the melting point of the material. The high temperature, or temperatures at or above the melting point of the material, are maintained only long enough to obtain the fused surface. The temperature is, however, reduced so that when the moisture content of the mass is substantially all expelled the temperature will have dropped to considerably below the melting point of the material.

If desired, the oven may be arranged so that one end thereof has a temperature of from 500–700°, while the other end may be as low as 100° C. The material is then inserted at the high temperature end and is passed through to the low temperature end.

It is understood that when the above specification speaks of the silica content, the percentages are given on the basis of the dry or water-free substance.

The specific gravity of the finished block may be regulated by the amount of raw material used in the mold. The higher the amount of material used, the greater the pressure which will be generated in the baking and molding step of the process, and the higher the specific gravity of the resulting product. In this way specific gravities higher than 0.15 are obtainable. In addition the surfaces may have a somewhat higher specific gravity than the mass of the block due to the better heat transfer and partial fusion which may be made to occur by choosing suitable temperatures.

What I claim is:

1. A block of cellular alkali silicate material having the interior of a lower specific gravity than the surface material.

2. A block of cellular alkali silicate material of a specific gravity of 0.05 to 0.25 and having its interior of a lower specific gravity than the surface material.

3. A block of cellular alkali silicate material having a surface of fused or partially fused alkali silicate.

4. A block of cellular alkali silicate having between 76% and 80% silica.

5. The method of treating alkali silicate material which consists in heating same in the form of a glassy solid at a temperature above its fusion point and expelling the moisture therefrom, and reducing the temperature to below the fusion point prior to the complete expulsion of the moisture.

6. The method of treating alkali silicate material which consists in heating said material in the form of a glassy solid to a temperature 500–700 degrees C. and reducing the temperature to below its melting point when the moisture is expelled.

7. The method of treating alkali silicate material comprising the steps of heating said material to remove water therefrom, forming said material in molds, and then baking same at temperatures above the melting point of said material to convert same into a uniformly cellular mass, and reducing the temperature to below the fusing point when the moisture is expelled.

8. The method of treating alkali silicate material which comprises the heating of commercial alkali silicate to convert same into a glassy solid, and then converting same into a uniformly cellular mass having a dense exterior by heating at 500–700° C. for 5 to 30 minutes.

9. A block of cellular alkali silicate material of a specific gravity between .15 and .25.

In testimony whereof I have affixed my signature to this specification.

NATHANIEL M. ELIAS.